United States Patent
Gough

(10) Patent No.: US 8,116,609 B2
(45) Date of Patent: Feb. 14, 2012

(54) METHOD AND APPARATUS FOR TRAVERSING A MULTIPLEXED DATA PACKET STREAM

(75) Inventor: Michael L. Gough, Ben Lomond, CA (US)

(73) Assignee: 658276 N.B. Ltd., Fredericton, NB (CA)

( * ) Notice: Subject to any disclaimer, the term of this patent is extended or adjusted under 35 U.S.C. 154(b) by 0 days.

(21) Appl. No.: 11/496,037

(22) Filed: Jul. 29, 2006

(65) Prior Publication Data

US 2007/0058927 A1    Mar. 15, 2007

Related U.S. Application Data

(63) Continuation of application No. 10/921,491, filed on Aug. 19, 2004, now abandoned, which is a continuation of application No. 10/056,797, filed on Jan. 18, 2002, now Pat. No. 6,798,973, which is a continuation of application No. 09/259,398, filed on Feb. 26, 1999, now Pat. No. 6,442,329.

(60) Provisional application No. 60/076,388, filed on Feb. 28, 1998.

(51) Int. Cl.
   *H04N 9/80* (2006.01)
   *H04N 5/783* (2006.01)
(52) U.S. Cl. .................. 386/241; 386/344; 386/351
(58) Field of Classification Search .............. 386/68, 386/69, 70, 125–126, 241, 248, 344, 345; 369/30.1
   See application file for complete search history.

(56) References Cited

U.S. PATENT DOCUMENTS

| | | | |
|---|---|---|---|
| 4,592,036 A * | 5/1986 | Furuya et al. | 369/30.21 |
| 4,752,836 A | 6/1988 | Blanton et al. | |
| 5,001,570 A | 3/1991 | Tagawa | |
| 5,081,616 A * | 1/1992 | Kitahara et al. | 369/30.1 |
| 5,189,237 A | 2/1993 | Koguchi | |
| 5,278,964 A | 1/1994 | Mathews et al. | |
| 5,508,983 A | 4/1996 | Nakamura et al. | |
| 5,511,000 A * | 4/1996 | Kaloi et al. | 704/201 |
| 5,596,420 A | 1/1997 | Daum | |
| 5,596,564 A * | 1/1997 | Fukushima et al. | 386/70 |
| 5,598,580 A | 1/1997 | Detschel et al. | |
| 5,602,956 A * | 2/1997 | Suzuki et al. | 386/68 |
| 5,621,840 A * | 4/1997 | Kawamura et al. | 386/68 |
| 5,675,693 A | 10/1997 | Kagoshima | |
| 5,701,385 A | 12/1997 | Katsuyama et al. | |
| 5,729,516 A * | 3/1998 | Tozaki et al. | 369/53.21 |
| 5,745,645 A | 4/1998 | Nakamura et al. | |
| 5,754,728 A | 5/1998 | Nakajima et al. | |
| 5,761,163 A | 6/1998 | Nakane et al. | |
| 5,870,523 A * | 2/1999 | Kikuchi et al. | 386/241 |
| 5,949,948 A | 9/1999 | Krause et al. | |
| 5,978,792 A | 11/1999 | Bhargava et al. | |
| 6,002,834 A | 12/1999 | Hirabayashi et al. | |
| 6,137,945 A | 10/2000 | McGrath | |
| 6,201,927 B1 | 3/2001 | Comer | |

(Continued)

*Primary Examiner* — Vincent Boccio
(74) *Attorney, Agent, or Firm* — Don Mollick

(57) ABSTRACT

A method for traversing a multiplexed data packet stream including choosing a starting location in a multiplexed data packet stream; making a bi-directional search from the starting location to locate a nearest system stream object; and traversing the system stream as a doubly-linked list of objects. Traversing the system stream preferably includes traversing object links of the doubly-linked list of objects. The objects are further preferably cached with an LRU process. Multiple disjoint locations in the system stream can be accessed with a virtual linked list. The virtual linked list can be used to search forwardly; backwardly, or both forwardly and backwardly.

19 Claims, 14 Drawing Sheets

U.S. PATENT DOCUMENTS

| | | |
|---|---|---|
| 6,442,329 B1 | 8/2002 | Gough |
| 6,512,883 B2 * | 1/2003 | Shim et al. .................... 386/248 |
| 6,798,973 B2 | 9/2004 | Gough |
| 2002/0122485 A1 | 9/2002 | Gough |

* cited by examiner

Virtual linked list for packets

LRU packet cache

LRU Transport packets

Transport packets

LRU Page Buffer

METHOD AND APPARATUS FOR TRAVERSING A MULTIPLEXED DATA PACKET STREAM

CROSS REFERENCE TO RELATED APPLICATION(S)

This application is a continuation of U.S. application Ser. No. 10/921,491 filed Aug. 19, 2004 now abandoned, which is a continuation of U.S. application Ser. No. 10/056,797, filed Jan. 18, 2002, now U.S. Pat. No. 6,798,973, which is a continuation of U.S. application Ser. No. 09/259,398, filed Feb. 26, 1999, now U.S. Pat. No. 6,442,329, which claims the benefit of U.S. Provisional Application No. 60/076,388, filed Feb. 28, 1998, all of which are incorporated herein by reference.

BACKGROUND OF THE INVENTION

This invention relates generally to the reading of a multiplexed data packet stream, and more particularly to the reading of MPEG and DVD streams.

In its earliest years, video was transmitted and recorded as analog signals. However, it has long been recognized that video can also be transmitted in digital form. The advantage of digital video includes the ability to compress the digital information, error correction, and reduced signal degradation.

One technique for transmitting digital video is to break the digital information into discreet "chunks" or "packets" of data. These packets can be multiplexed with other packets, e.g. other video data, audio data, and other multi-media type data. Therefore, multiple signals, digitally stored in packets, can be interlaced and interwoven to provide multiple channel or multimedia content.

In FIG. 1, two signal streams are represented. A first string 10 is a video signal stream, and a second stream 12 is an audio signal stream. In its representation, the video signal stream is represented as a number of video "frames" 14a, 14b, 14c, 14d, 14e, 14f, 14g, and 14h. When being viewed, the frames 14a-14f are displayed or projected in rapid sequence, providing the illusion of motion.

In frame 14a, a horse 16 is galloping towards an object 18. In frames 14b, c, and d the horse 16 continues to gallop and passes the object 18. In frame 14e, the horse 16 is shot with a gun 20, and in frames 14f-14h, the horse falls to the ground, dead.

It is quite possible to store and transmit pixel information for each of the frames of 14a-14h of the video stream 10. However, this represents a tremendous amount of data, in that each frame can include millions of bites of information. For this reason, compression techniques such as MPEG, use a variety of techniques to minimize the amount of data that needs to be sent in order to reconstruct the frames 14a-14h. For example, MPEG uses a technique to reduces the amount of information sent for a new frame based upon the data that has already been sent in previous frames.

The audio stream 12 is shown here in analog form. However, if it is to be sent along with the video stream 10, it is also preferably packetized so that both the video stream 10 and the audio stream 12 can be sent along the same transmission channel. However, since the video stream 10 and the audio stream 12 must be synchronized such that. for example, when the gun 20 in frame 14e shoots the horse 16 the "bang" 22 of the gun is synchronized with the display of the frame 14e. This is referred to as temporal synchronization.

FIG. 1 therefore represents "unpacketized" video and audio streams. In FIG. 2, the audio and video streams have been converted into a multiplex data packet stream. More particularly, the data packet stream of FIG. 2 is referred to as a "system stream" of data packets 26a, 26b, 26c and 26d. In this example, packets 26a, 26b, and 26d are video data packets, and packet 26c is an audio data packet. Each of the data packets includes a header portion 28, and a payload section 30.

Generically, system streams as illustrated in FIG. 2 are used to embed digitized video streams and audio streams 12 of FIG. 1. Generally, the packets 26a-26d are of fixed size but they can also be made to have variable size.

The headers 28 store meta data, which includes such information as packet size, a time stamp, etc. The header areas 28 can also store other data or programs.

Video and audio packets are often designed so that they are large enough to accommodate more than one frame of video or audio data. Therefore, if the payload section 30 is large enough, a full frame and part of another frame can be stored within a single packet. For example, with video packet 26a all of frame 14a and a portion of frame 14b are stored in the payload section 30. In the video packet 26b, the rest of frame 14b and all of frame 14c are stored within the payload 30 of the video packet. Likewise, a marker 32 in audio packet 26c indicates that all of an audio frame 34, and a portion of the next audio frame 36 are stored within the payload section 30.

It should be noted that it is totally arbitrary how big the payload section 30 of a particular packet should be. For example, a payload section can be anywhere from one byte to one gigabyte in length. These payload sections are generally fixed, but are sometimes made variable depending on the desires of the programmer.

It should be noted that the packet size and the frame size are totally unrelated. The packet size is based upon the expectation of the data packet stream readers. For example, data packet stream readers include buffers of a given size, which expect the packets to be of a proper size to keep them full. Therefore, the encoder which creates the packets 26a-26d models the needs of the decoder or readers, and will change packet size for a given decoder type. However, since decoders or readers are standardized, the size of the packets created by the encoders also tend to be standardized.

In FIG. 3, the system stream of FIG. 2 has been transformed into a transport stream for actual transmission. The transmission stream includes a number of very small packets 38a, 38b, 38c, 38d, 38e, and 38f. Collectively, these packets 38a-38f form the video packet 26a of FIG. 2. These packets 38a-38f include their own headers 40 and payloads 42. It would be noted that the payload 42 of packet 38a includes the header 28 of the video packet 26a plus a small portion of the frame 14a of the video packet 26a. Therefore, the system stream shown in FIG. 2 is a higher level stream than the transport stream of FIG. 3. In this example, the transport level is the lowest level stream, and is the stream that is actually transmitted.

In this example, the data packet 38a-38f are rather small, e.g. 188 bytes in length. Since a frame can comprise many thousands of bytes of data, it takes a great many packets 38a-38f to carry the information for a single frame of data. For the purpose of error correction, some of the data packets 38a-38f are repeated once or twice. For example, packet 38d is a repeat of 38c, and packet 38f is a repeat of packet 38e.

The above descriptions are somewhat conceptual in that they illustrate actual image frames being sent. However, as is well known to those skilled in the art, compression technology such as MPEG do not send pictures, per se, but send motion vectors which indicate changes from previous frames.

However, periodically, the whole frame is sent in what is known as a I frame. Other frames may have part of a picture, but with pointers to an I frame or another frame.

The sequential transmission of a large number of the data packets 38a-38f of FIG. 3 comprise the transport stream 44. Once the transport stream has been received, it must be decoded or "read" in order to recover the original data.

In FIG. 4, a conceptual representation of a reader takes the transport stream 44 and puts it through an input/output (I/O) process 46 to fill a "pipeline" or buffer 48. The portion 50 of the buffer indicates the filled region, and the portion 52 of the buffer indicates that portion of the buffer that can be filled with new data from the transport stream 44. The I/O process 46 can determine the boundary line or pointer 54 between the filled and the unfilled regions of the buffer 48, and can determine when the buffer 48 is sufficiently low enough that additional data from the transport stream 44 should be entered into the buffer. The data within the buffer 48 moves toward the base 56 of the buffer as indicated by arrow 58 where a parcer process 60 reads a segment 62 of the buffer and reconstitutes, for example, the frame 64.

It should be noted that the conventional reading process 66 of the prior art is a destructive reading process in that the data slides towards the base 56 of the buffer 48 and therefore overrides the portion 62 that has already been read by the parser 60. Therefore, as the process 66 gathers data, the original data is lost by being overwritten by new data to be read. As a consequence, there is no practical way to read backwards in a multiplex data packet stream of the prior art.

It will therefore be appreciated that readers for multiplexed data packet streams of the prior art have very limited abilities to transfer the data packet stream. In particular, they have almost no ability to accurately traverse a data packet in the reverse direction due to the movement of the data through the buffers through the reading process.

SUMMARY OF THE INVENTION

The present invention is preferably implemented with a set of C++ classes designed to make MPEG streams (or other data packet streams such as DVD streams) easier to work with. They accomplish this by making useful data abstractions, enabling MPEG software developers to write cleaner, better factored code.

The present invention permits a user to seek to an arbitrary location in an MPEG (or other) system stream, and provides a tool to "sync up" on the system stream such that the nearest system stream object is returned. The search used to locate this object is bi-directional, and is robust with respect to end of stream and beginning of stream boundary conditions. This feature of the present invention is typically used to seek a location in the stream corresponding to an approximate time calculated from the stream bit rate.

Once the arbitrary system stream object is obtained, the system stream can be considered in an entirely new fashion: as a doubly-linked list of objects. This permits a user to can scan forwards and backwards in the system stream by traversing object links. The present invention uses an LRU scheme to keep objects in memory while they are in use and re-uses memory as new places in the stream are sought. In consequence, objects are referenced by absolute byte position in the stream, allowing the present invention to reclaim memory. Multiple disjoint locations may be accessed in the system stream "virtual linked list."

Since the present invention also uses an LRU scheme for low level I/O buffering, an object may sometimes straddle a page boundary; the object is not in contiguous memory. For this reason, The present invention provides tools for seamless access to the data in an object. Also, the number of pages and the size of the pages in the low level IO LRU paging buffer can be controlled by the user.

The present invention further provides a tool for locating the nearest packet with a specified stream ID. Therefore, forward searches, backward searches, or bi-directional searches are possible in the system stream virtual linked list.

Once a user has a reference to a packet with the specified stream ID, the present invention allows the creation of a new stream which contains only data from the payload section of packets homogenous with the packet. This essentially demultiplexes the system stream. The homogenous stream is pure video or audio, depending on the stream ID that was selected. The streams origin is set at the first payload byte of the start packet. A user can seek forwardly with positive offsets, or backwardly with negative offsets.

In consequence, a user can seek arbitrarily in the homogenous stream. The present invention allows a user to view a homogenous stream as a virtual linked list, as described above. The objects worked with at this level are video objects. A user can traverse the virtual linked list forwardly and backwardly to find a particular video object. A user can further interrogate a video object to find out what system stream packet it starts in. This is useful for determining to which frame the packet's DTS/PTS time stamp information applies.

The present invention therefore provides tools for seamless access to the data in a video object, which may straddle packet boundaries in the system stream, or low level IO page boundaries, and further provides tools for accessing data at the bit level, and for performing forward and backward seeks at the bit level. It will therefore be appreciated that the present invention is a useful addition for many MPEG and other data stream applications.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1:
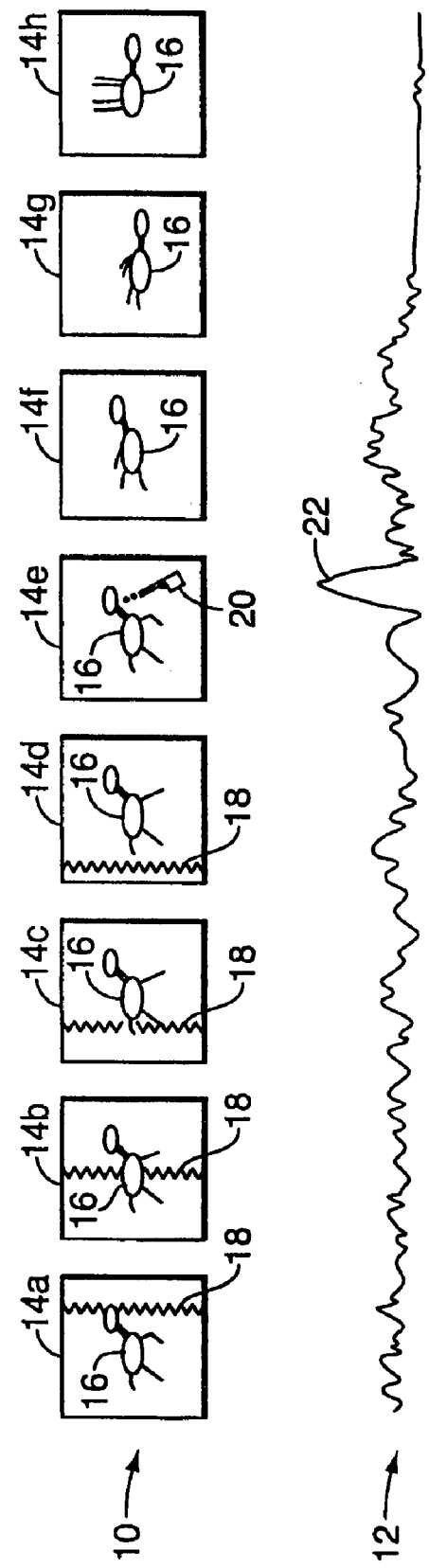
FIG. 1 is an illustrated illustration of a video stream and synchronized audio stream in accordance with the prior art.
Figure 2:
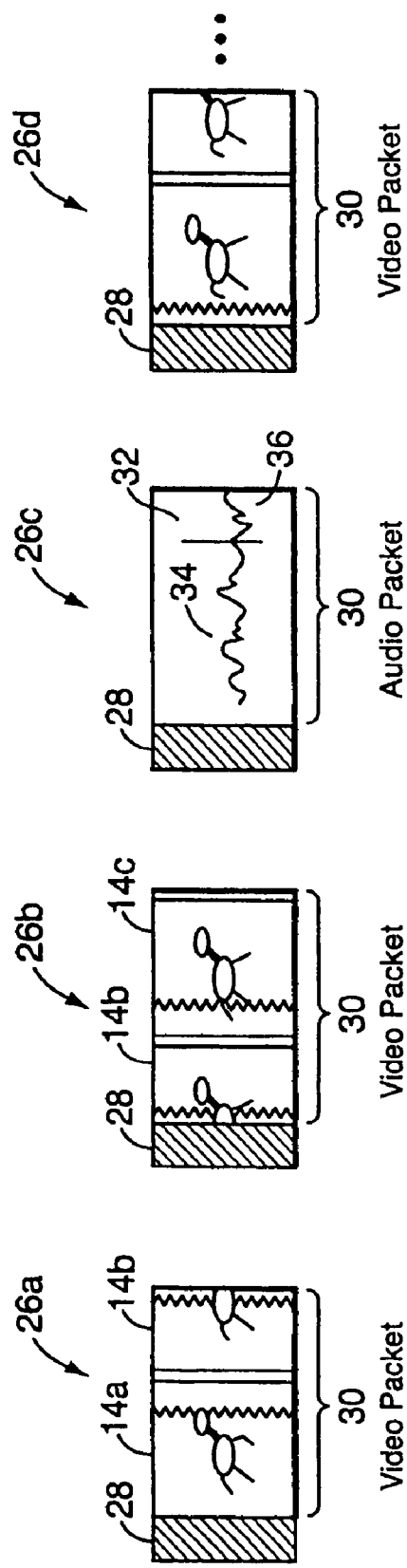
FIG. 2 is an illustration of a packetized system stream of the prior art.
Figure 3:
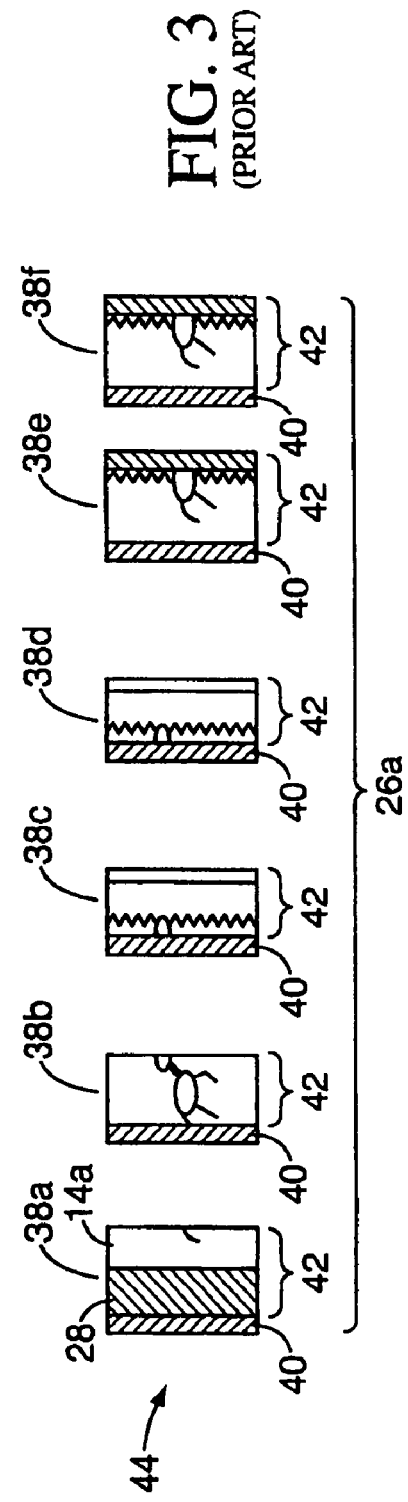
FIG. 3 is an illustration of a packetized transport stream of the prior art.
Figure 4:
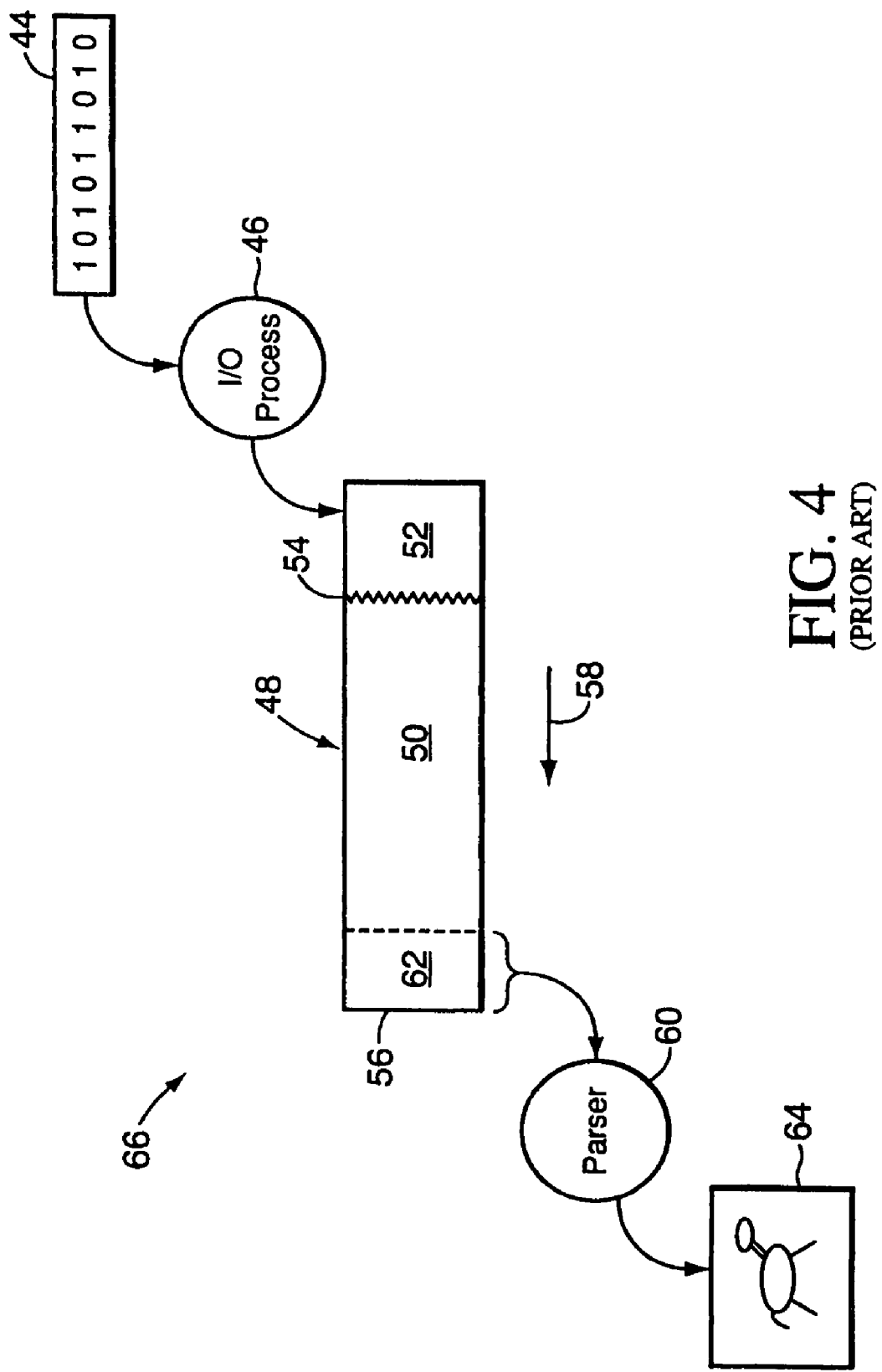
FIG. 4 is an illustration of a decoder or reader process of the prior art.
Figure 5:
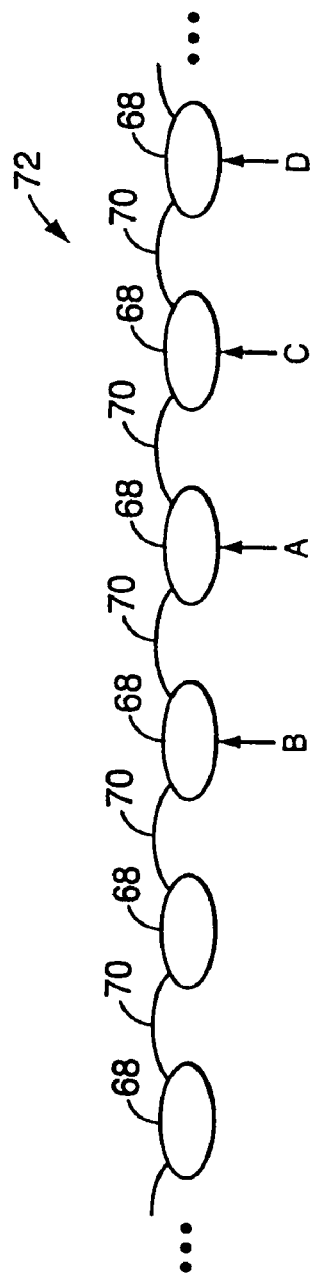
FIG. 5 is an illustration of a virtual linked list for video objects in accordance with the present invention.

FIGS. 1-4 were described with reference to the prior art. In FIG. 5 a virtual linked list for video objects in accordance with the present invention will be described.

An important aspect of the present invention is that data is not being moved around within a buffer, as was the case in the prior art. Instead, the data is held statically within a buffer and is manipulated from the static buffer in order to provide the advantages of the present invention. To implement this process, a "lease recently used" or "LRU" linked list is preferably used. LRU linked lists are well known to those skilled in the art, and are commonly used in virtual memory systems. However, the use of LRUs to traverse a data packet strain has not heretofore been done.

In FIG. 5 the virtual linked list of video objects include a number of objects 68 and a number of links 70. The meaning of "objects" and "links" will, of course, be clear to those skilled in the computer science art. Several of these objects 68 are referenced as A, B, C, and D.

The virtual linked list of FIG. 5 operates as an LRU buffer, as will be appreciated by those skilled in the art. This LRU buffer 72 is one of the lowest levels of the present invention, is just above the input/output (I/O) services or drivers. As will be appreciated by those skilled in the art, the I/O service supplies data to the paging memory. Typically, it provides a service to the "caller" i.e. another computer implemented process, so that caller can call for any single page full of memory. As is known to those skilled in art, a page of memory is a fixed length file, e.g. 4K, 16K, 1 mg etc.

The LRU buffer 72 operates on fixed length pages. The process above this LRU buffer simply specifies a particular page. It should be noted that there is no correlation between the pages and the frames of the digital video being transmitted. A preferred embodiment of the present invention uses 16K pages.

The LRU is at the top of the links when it is being used, and all others are shifted downwardly. That is, the data within the buffer does not move, but the links themselves are changed. Therefore, unlike the prior the data does not shift within physical memory and, therefore, historical data is not lost after it is read from the bottom of the buffer. As a result, the virtual linked list of FIG. 5 is a conceptual ordering, not a physical ordering. Virtual linked list such as the virtual linked list of FIG. 5 are well known to those skilled in the art as "doubly linked lists".

One part of the process of the present invention deals only with video streams, and another part of the invention deals only with audio streams. Information within the packets illustrated in FIG. 2 contain time stamps that are used by the present invention to synchronize the audio and video streams. Therefore, a virtual linked list of audio objects similar to the virtual linked list for video objects of FIG. 5 is also provided.

During playback, it is necessary to demultiplex the data packet streams such that pure video and pure audio streams are provided. With the linked list of audio objects of the present invention, a video object can be grabbed and the stream can be traversed forward or backwards along the links.

It should be noted that from a logical point of view each object has its own front and back links. However, these are not actual links but, rather, virtual links. In other words, the virtual linked list for video objects of FIG. 5 does not create the links until another process asks for the link. As long as the requested data is within the buffer, further I/O is not required. Eventually, however, some I/O must be performed to service a particular jump along a link, which will require additional data to be read into the buffer.

It will therefore be appreciated that FIG. 5 is an end result of a virtual linked list for video objects. As mentioned previously, there is a similar virtual linked list for the associated audio objects. Using the virtual linked list, the user jumps from one object to the next. The user can directly index an object, or an object can be accessed by its time stamp.

It should be noted that there is no index provided in an MPEG file. Therefore, there is no way to say where a frame is positioned. However, the process of the present invention is to find any arbitrary frame in the stream. This is not accomplished by the creation of an index, however. The process of the present invention receives a frame number and calculates the approximate location of the frame. Since the process of the present invention allows both a forward and backwards traversal of the data stream, this calculation an be quite accurate. This compares to the prior art where any such search must put in a front "fudge factor" (e.g. about 2 seconds) to ensure that they end up before the desired frame, because the processes of the present invention cannot traverse the data stream in a backwards fashion.

In contrast to the prior art, the present invention calculates exactly where the frame should be and then searches both forward and backward (i.e. bi-directionally) until the desired frame is found. Therefore, the search capabilities of the present invention are far more accurate than those found in the prior art.

Figure 6B:
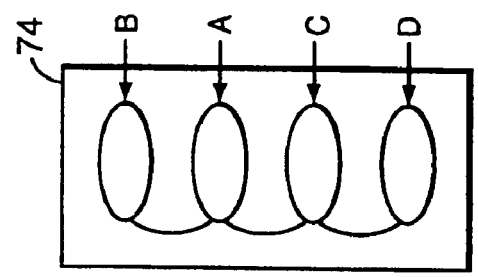
FIG. 6b is LRU object list after the traversal from point A to point B in the virtual linked list of FIG. 5.
Figure 6A:
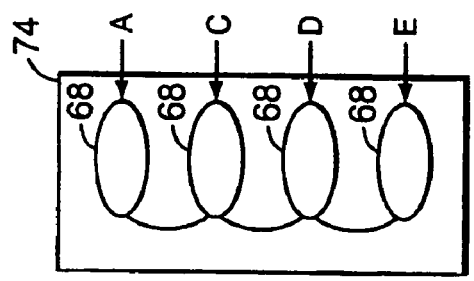
FIG. 6a is an LRU object list prior to a traversal from points A to B in the virtual linked list of FIG. 5.

The virtual linked list of FIG. 5 will be described in greater detail in terms of an example. More particularly, we will take the example of moving from object A to object B in FIG. 5. In FIG. 6a, an LRU object list 74 is shown prior to the movement, and the LRU object list 74 is shown after the movement in FIG. 6b. More particularly, the illustration of FIG. 6a shows the physical linkage between the various objects 68 of the virtual linked list of FIG. 5. That is, the illustration of FIG. 5 shows the logical links and the illustration of FIG. 6a shows the physical links. To access the video object d of FIG. 5, the video object d jumps to the top of the LRU list as illustrated in FIG. 6b. The other video objects of the LRU list then move down by one operation. In other words, if the physical linkage is shown as in FIG. 6a is to be A-C-D-E, accessing object b will cause the LRU object list 74 in FIG. 6b to become B-A-C-D.

It will be appreciated that there are millions of frames that are present at the level of the virtual linked list of FIG. 5. However, the present invention has in the range of 50-100 objects at the LRU object list of FIG. 6a-b.

To get to the first video object, the process of the present invention begins at a random position and calculates where the middle is by the byte rate of the stream. Next, the process synchronizes with the byte stream by looking for an object. Once a first object has been found, the byte stream may be traversed forward and backwards as described previously.

Figure 7:
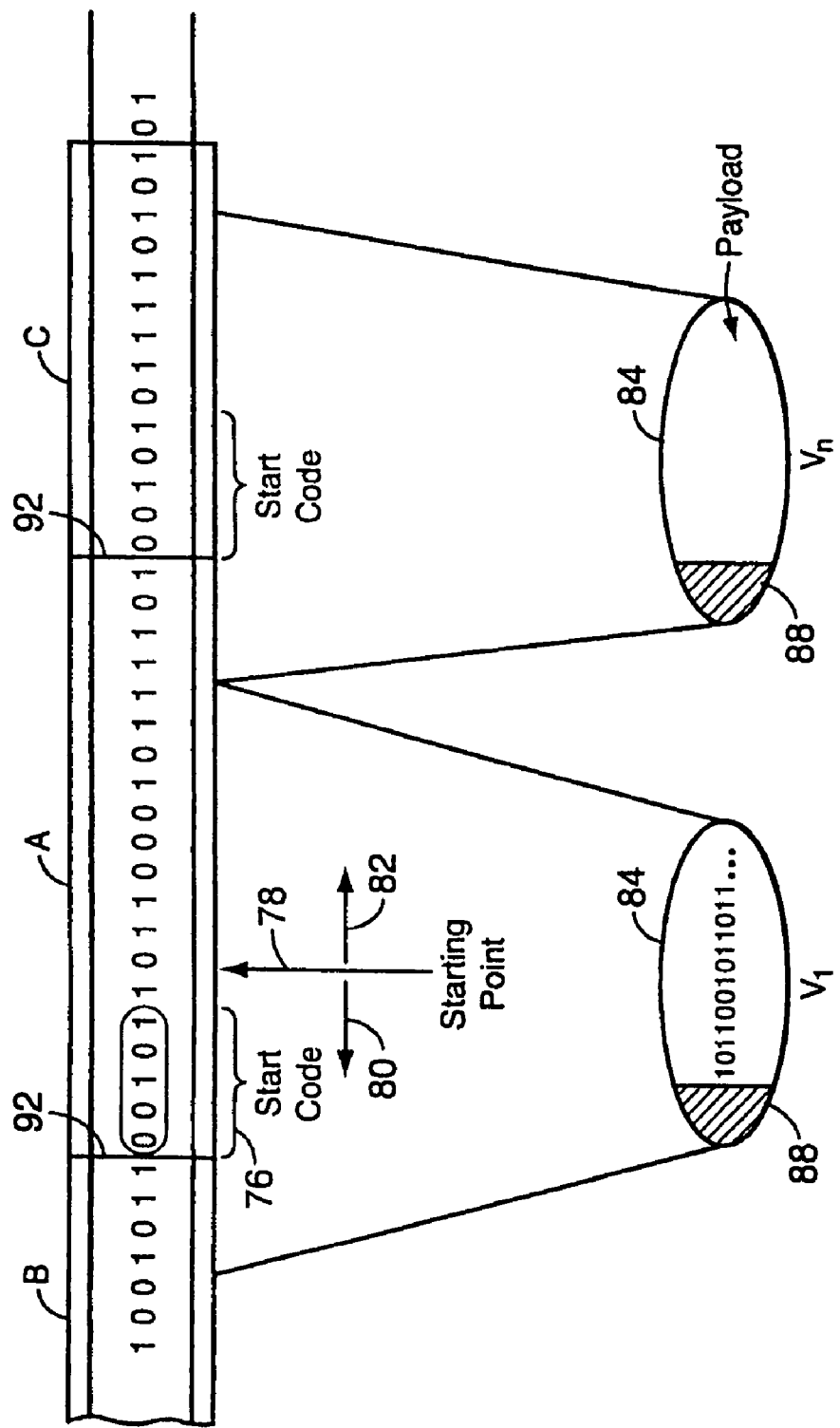
FIG. 7 illustrates a homogenous bit stream of the present invention.

FIG. 7 illustrates a homogenous byte stream in accordance with the present invention. This homogenous layer is below the layer represented by the LRU object list 6a and 6b. Nonetheless, the homogenous byte stream of FIG. 7 corresponds to the virtual linked list of FIG. 5.

We will now describe the process of the present invention for finding an object in the homogenous byte stream. Assume that a string of bytes designated by A is obtained as a chunk of data. A traversal request at the virtual linked list of FIG. 5 causes a jump to the homogenous mid stream of FIG. 7 to look for byte patterns for a start code at this level of protocol. Then using this start code 76 as a starting point 78 the byte stream is searching bi-directionally as indicated by arrows 80 and 82. Once an object, such as object V1 is found then the virtual links of the virtually linked lists of FIG. 5 can be traversed.

Figure 8:
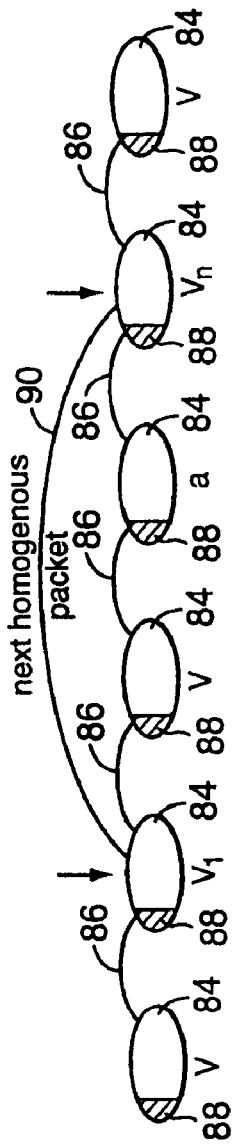
FIG. 8 is an illustration of a virtual linked list for the packets in accordance with the present invention.

FIG. 8 illustrates a virtual linked list for any type of object or packet. The homogenous byte stream of FIG. 7 rides on top of this virtual linked list for packets of FIG. 8. It should be noted that these packets 84 can be any type of object, and need not be MPEG, DVD or other objects. The objects 84 are linked with the links 86.

In the present example, the virtual linked list of FIG. 8 is packets for in the system stream. These packets include some video packets as indicated by the video and audio packets as indicated by the a. That is, the homogenous stream of FIG. 7 illustrates only the video, while the virtual linked list has both video and audio packets. As such, the homogenous stream of FIG. 7 is demultiplexed from the virtual linked list of FIG. 8. Since each homogenous stream of FIG. 7 represents only a single channel, there are multiple homogenous streams in accordance with FIG. 7 for other video and audio channels in the mutliplexed data packet stream.

It should be noted that there is header information 88 in each of the packets 84 of the virtual linked list of FIG. 8. This header information is not present in a homogenous stream of FIG. 7. In the virtual linked list of FIG. 8, the list can be traversed to the next packet and to the next homogenous packet such as by a link 90.

Briefly, referring again to FIG. 7, the big vertical lines 92 are logical break points or boundaries between objects and the bit streams. This data comes from packets (such as packets V1, Vn) which are shown in FIG. 7 and which are derived from the virtual linked list of FIG. 8. The present invention picks a stream ID from the header 88 in the packet 84. This provides a way to logically traverse the homogenous stream of FIG. 7.

The homogenous stream is traversed from the virtual linked list by jumping from one packet 84 to the next until the next homogenous packet is found.

Figure 9:
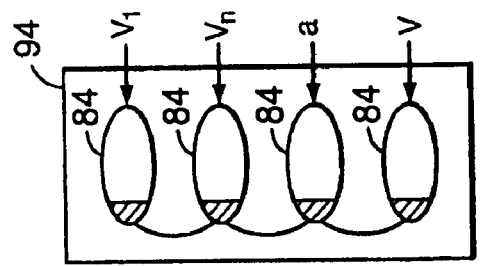
FIG. 9 is an illustration of the LRU packet cache.

In FIG. 9, an LRU packet cache 94 is illustrated. The packets cached in this LRU packet cache is shown by way of example only. The operation of the LRU packet cache is very similar to the operation to the LRU described with reference to FIGS. 6a and 6b.

At this point, a number of important features of the present invention will be pointed out. First, the process of the present invention uses a static buffer rather than a buffer in which the data "slides". Second, a virtual linked list packets is provided which creates what appears to be a homogenous stream of bytes extracted from selected packets in a virtual linked list. This allows the forwards and backwards traversal of the stream at any level of the stream, e.g. at the levels of FIGS. 5, 7, or 8. That is, the stream can be traversed at the bytes and bits object space of FIG. 7 or in the packet space of FIG. 8.

It should be further noted that the chain of packets or data can be assembled by the user. An LRU buffer can be plugged into any point to make things go faster. For example, the buffer can be inserted between any two levels. An I/O buffer brings data into a physical file, such as the file of FIG. 7. The provision of another LRU at the level of FIG. 7 will provide the bits in a sameness manner.

It also will be appreciated that an LRU buffer can be inserted into any level of a multilevel packetized hierarchy. This allows the conversion of a virtual representation into a real representation at those levels. It will also be noted that the present invention handles "cracks". As is well known to those skilled in the art, cracks are introduced by fixed size pages, (e.g. the vertical lines 92 in FIG. 7), and also introduced by the beginning and end of the payload section of the packets. Each level of abstraction provides a "view" of its data to the higher levels which is seamless. Requests for data that are received by the layer are examined to determine whether or not the request spans multiple packets or pages. If it does, the request is broken down into multiple requests, each of which spans only one of the aforementioned pages or packets which are managed by the layer.

Figure 10:
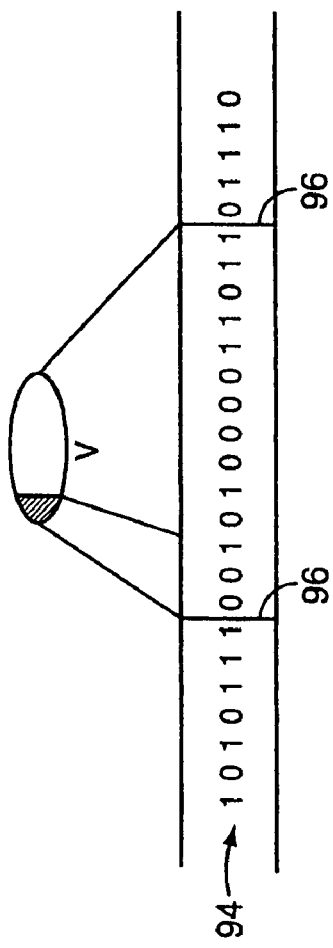
FIG. 10 is an illustration of the string of bytes as developed by the present invention.

FIG. 10 shows that a bit stream provided by an abstraction layer can contain packets for a higher layer. The packet begins at a point in the bit stream 96 and ends at another point in the bit stream 96. The packet header is located in the first bits in this portion of the packet, and the remainder of the packet, the "payload section" is located in the subsequent bits of the bit stream.

Figure 11:
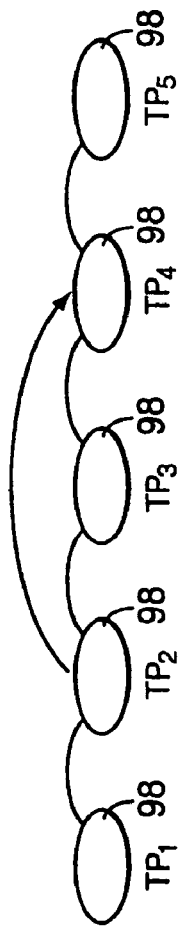
FIG. 11 illustrates the transport packets of the present invention.

FIG. 11 shows a virtual linked list of transport packets 98. Transport streams commonly replicate packets for redundancy purposes or to match fixed bit rates. Since there are sometimes duplicate packets, the abstraction layer that handles them automatically skips over them, thus providing a view of the bitstream that is free of replicated data.

Figure 12:
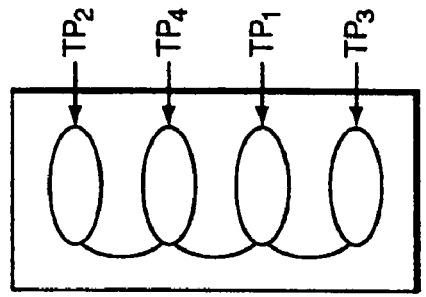
FIG. 12 illustrates the LRU for the transport packets of FIG. 11.
Figure 13:
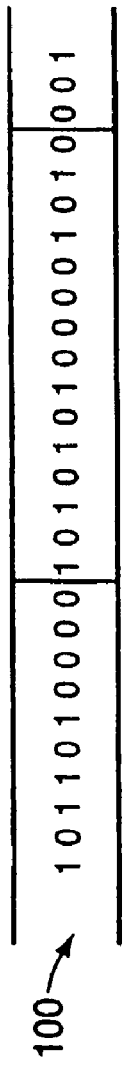
FIG. 13 is an abstraction representing physical pages of fixed length in accordance with the present invention.
Figure 14:
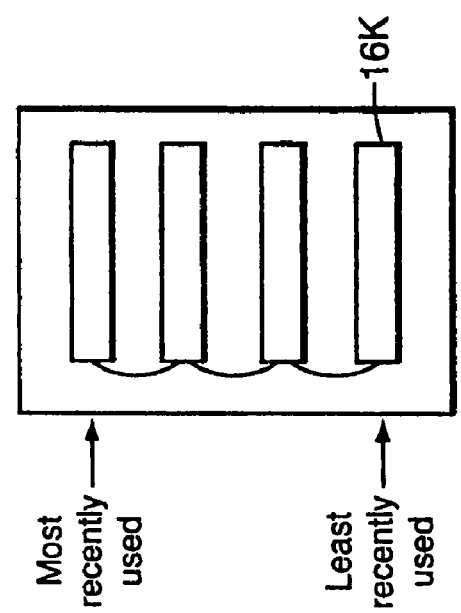
FIG. 14 is an illustration of the LRU page buffer for the physical page abstraction of FIG. 13.

FIG. 12 is the LRU for the transport packets. The virtual linked list of FIG. 11 and the LRU of FIG. 12 operate analogously to the previous levels. FIG. 13 illustrates a bit stream 100 which is below the virtual linked list for transport packets of FIG. 11. The bit stream 100 of FIG. 13 is an abstraction representing physical pages of fixed length. All previous cracks were of variable length. Since the physical pages are of fixed length in this bit stream, it is possible to vector (which is not possible with the layers above this layer with the variable cracks). In this fashion, it is possible to jump directly to a desired physical page. The LRU page buffer for the bit stream of FIG. 13 is shown in FIG. 14.

Figure 15:
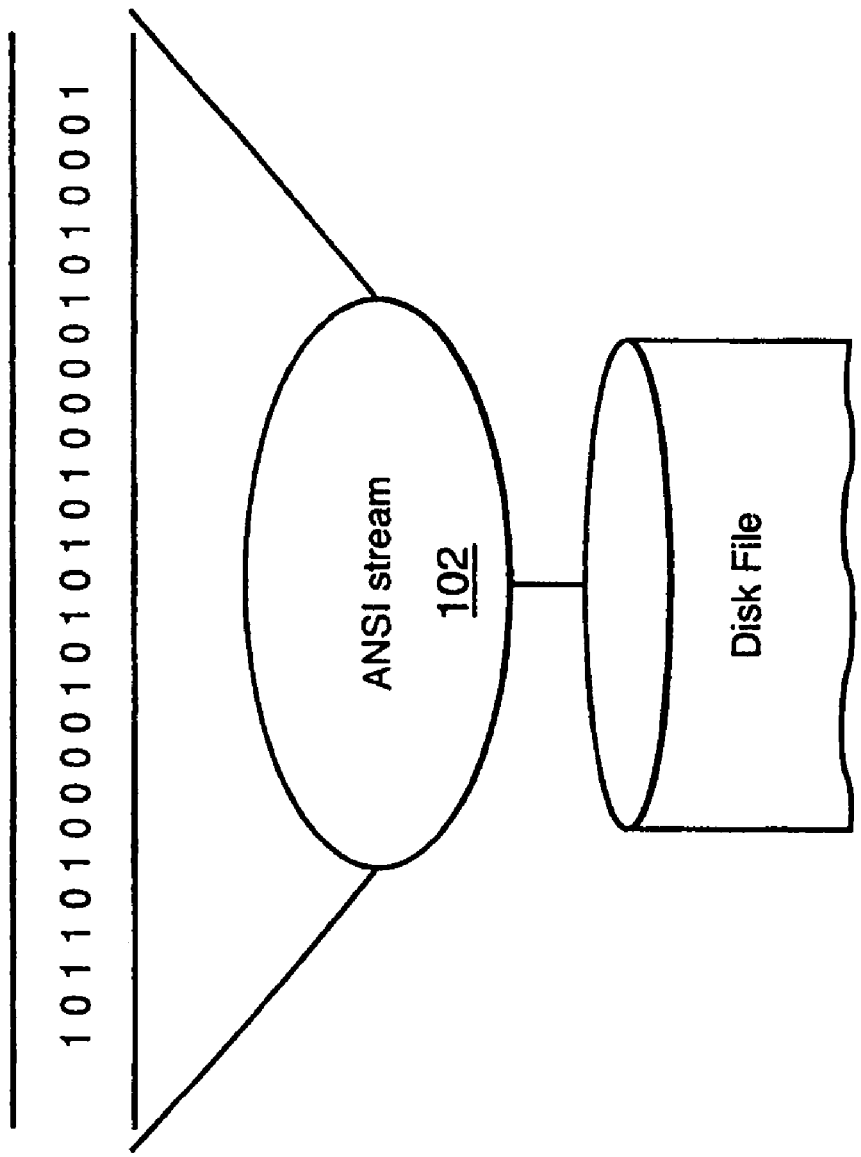
FIG. 15 is a protocol converter for an ANSI stream in accordance with the present invention.

FIG. 15 is a protocol converter for an ANSI stream 102. As is well known to those skilled in the art, there is an ANSI standard protocol for stream I/O. This protocol is available for the C++ programming language. The present invention provides an augmented stream protocol necessary for the kind of bi-directional searching described previously. The searching requires that it be possible to set the "origin" of the stream at an arbitrary position and search forward with a positive offset and backward with a negative offset. The stream protocol used in the present invention also provides for a negotiation between levels that minimizes the number of physical block transfers. Thus the semantics for stream protocols in the present invention require more advanced semantics which are not provided by the standard ANSI stream protocol. This is not true however at the lowest level of IO where bytes are being read from a file or other media. It is sufficient that the stream origin can be set at the beginning of the file, and all offsets are positive. Since it is desirable that standard mechanisms be utilized wherever possible, the protocol converter is used to convert IO requests made by one of the levels in the present invention into ANSI compatible IO. Since none of the advanced features are required when doing low level IO, the semantics are compatible with those provided by the ANSI standard stream protocol. Thus the protocol converter in FIG. 15 is used to translate IO requests into the semantically equivalent calls to the ANSI stream protocol. Protocol converters of this kind are well known to those skilled in the art.

Figure 16A:
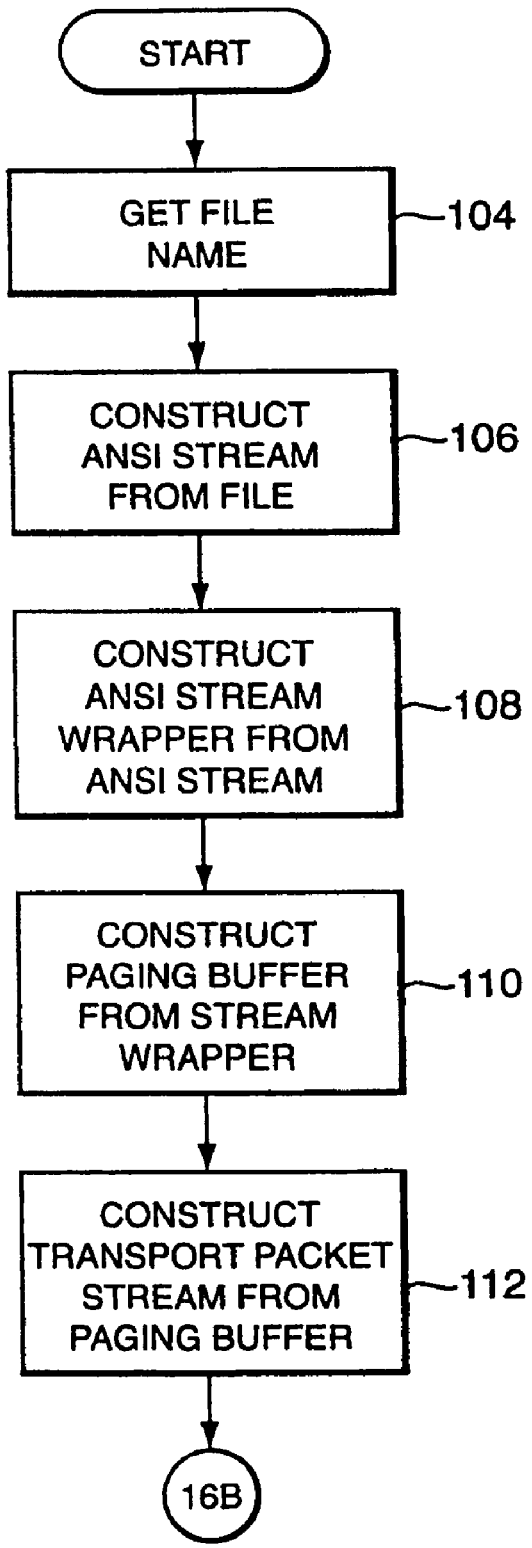
FIG. 16a and FIG. 16b illustrate a process in accordance with the present invention.
Figure 16B:
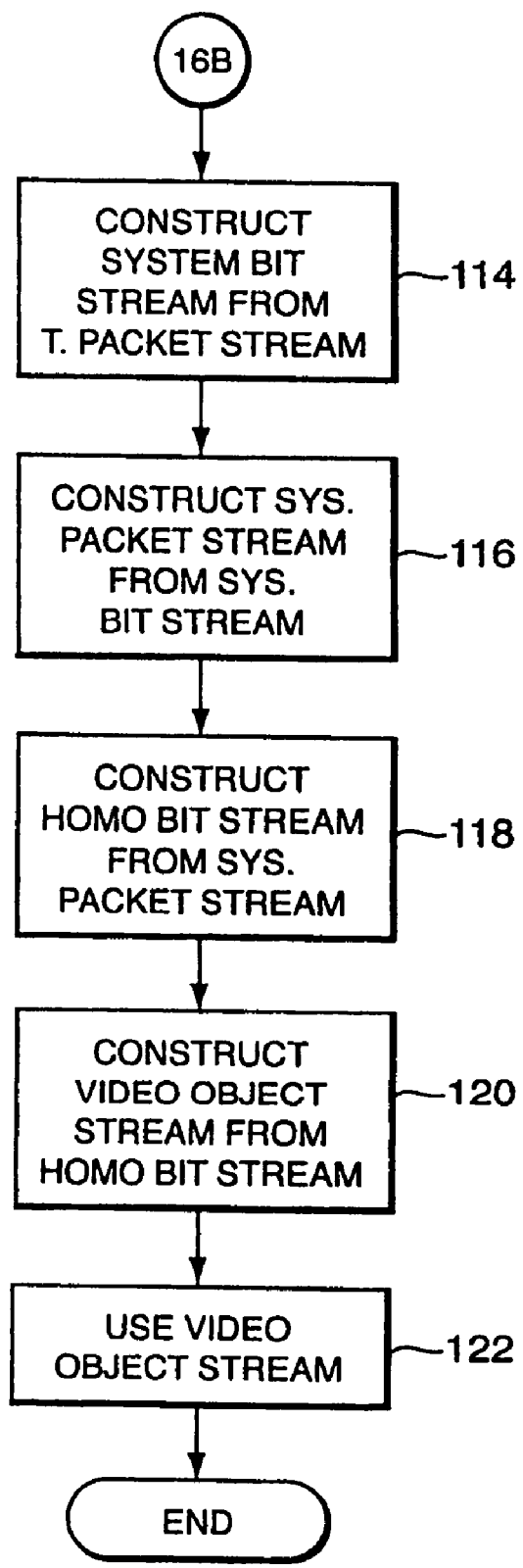

FIG. 16A combined with FIG. 16B describes a canonical implementation of the present invention. It is in this process that the various layers are assembled together. Many combinations and variations are possible because of the commonality in the interfaces between layers. For example, paging buffers can be inserted between any two layers that use stream protocol. This can be used to tune performance as mentioned previously.

A file name is obtained in operation 104. The specified file contains a stream that is to be accessed with the present invention. Alternatively, the data could be obtained from a telecommunications network in real-time. An ANSI stream object is constructed in operation 106 from the file name obtained in operation 104. A protocol converter 102 or "ANSI stream wrapper" is constructed in operation 108, which contains a reference to the aforementioned ANSI stream. In operation 110, a paging buffer such as that shown in FIG. 13 is constructed by passing it a reference to the aforementioned ANSI stream wrapper or protocol converter 102. In operation 112, a transport packet stream such as that shown in FIG. 11. is constructed. A reference to the paging buffer (shown in FIG. 13) is passed to the transport packet stream. This reference is stored in the transport packet stream and used later when requests are made to the transport packet stream requiring it to read packets.

A system bit stream is constructed in operation 114 shown in FIG. 16B which contains a reference to the transport packet stream which was constructed in operation 112. The reference is stored in the system bit stream object and is used later to obtain data from the payload sections of the packets provided by the packet stream. It should be noted that the "origin" of the system bit stream can be set to an arbitrary point in the middle of the stream. This is done to position the stream to a desired point in a time sequence. The position is calculated based on the bit rate of the stream. The present invention improves upon the prior art because it allows for bi-directional synching. The prior art requires that the stream be positioned to a point that is prior to the desired point, so that there is no chance that any inaccuracy in the calculation will lead to the stream being positioned past the desired point, since the prior art is unable to read the stream backwards. Operation 116 constructs a system packet stream. It is passed a reference to the system bit stream constructed in operation 114 which is used later to obtain data in order to service requests for system stream packets. Operation 118 constructs a homogenous bit stream. A reference to the system packet stream constructed in operation 116 is passed to the homogenous bit stream so that it can later obtain data from the system packet stream in order it service requests for data that are passed to it. In operation 120 a video object stream is constructed, and a reference to the homogenous bit stream (constructed in operation 118) is passed to the video object stream. This reference is later used to obtain data from the homogenous bit stream in order to service requests for video objects. Once operation 122 is reached, the layers have been properly constructed, and are ready to service high level requests. The high level requests generated in operation 122 are transformed through all of the layers constructed in the previous operations in FIGS. 16A and FIG. 16B.

Figure 17:
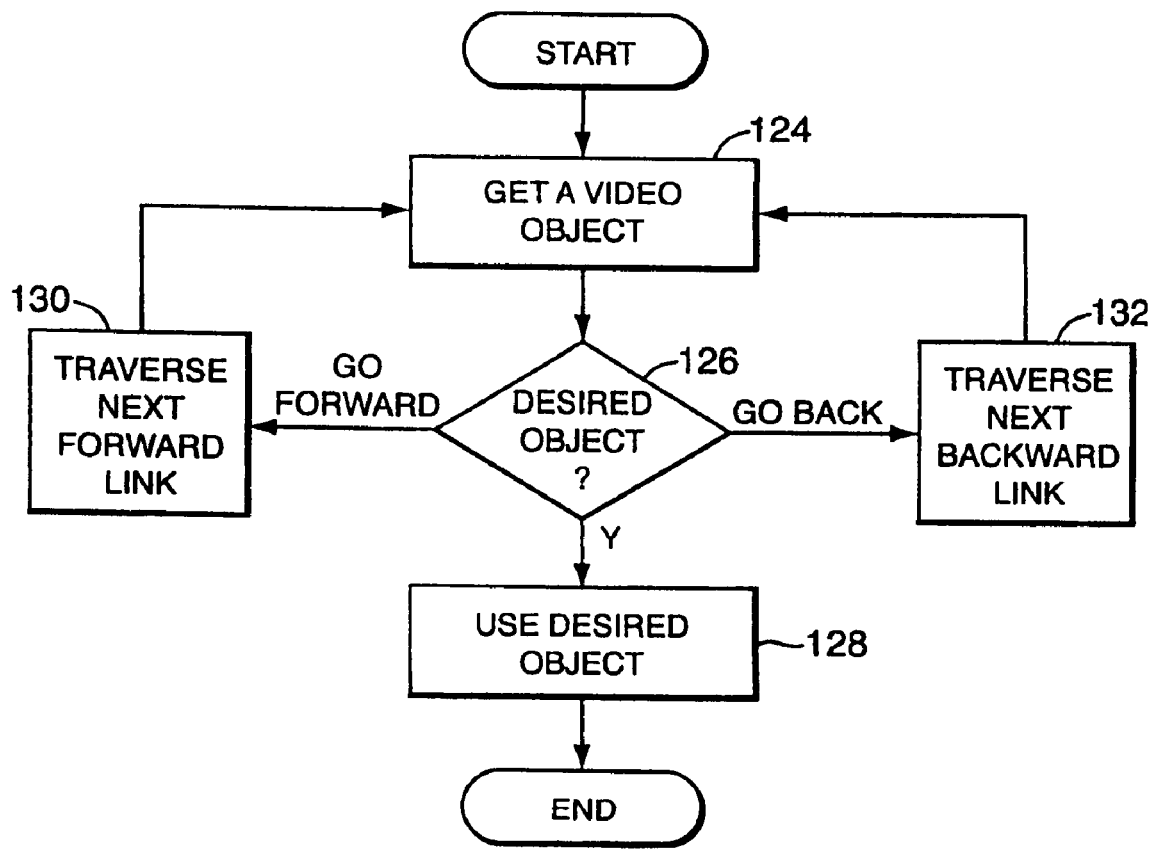
FIG. 17 is a flow diagram illustrating "use video object stream" operation of FIG. 16b.

FIG. 17 shows a more detailed description of 122 (shown in FIG. 16B). Operation 124 requests a desired video object. This request is passed to the video object stream constructed in FIG. 16B. The video object obtained is examined in operation 126, and if it is the desired object, it is used in operation 128. If it is not the desired object then a determination is made whether the desired object is forward or backward from the object obtained in operation 124. If a determination is made that the desired object is after the object obtained in operation 124, then operation 130 traverses the forward link to the next video object. The new object is then obtained in operation 124 and examined in operation 126. Alternatively, if it is determined that the object is before the object obtained, then the backward link is traversed in operation 132. The process loops until the desired object is obtained, and then it is used in operation 128. If the desired object is not present, then either the beginning of the stream or the end of the stream is reached and the process aborts with an error.

Figure 18:
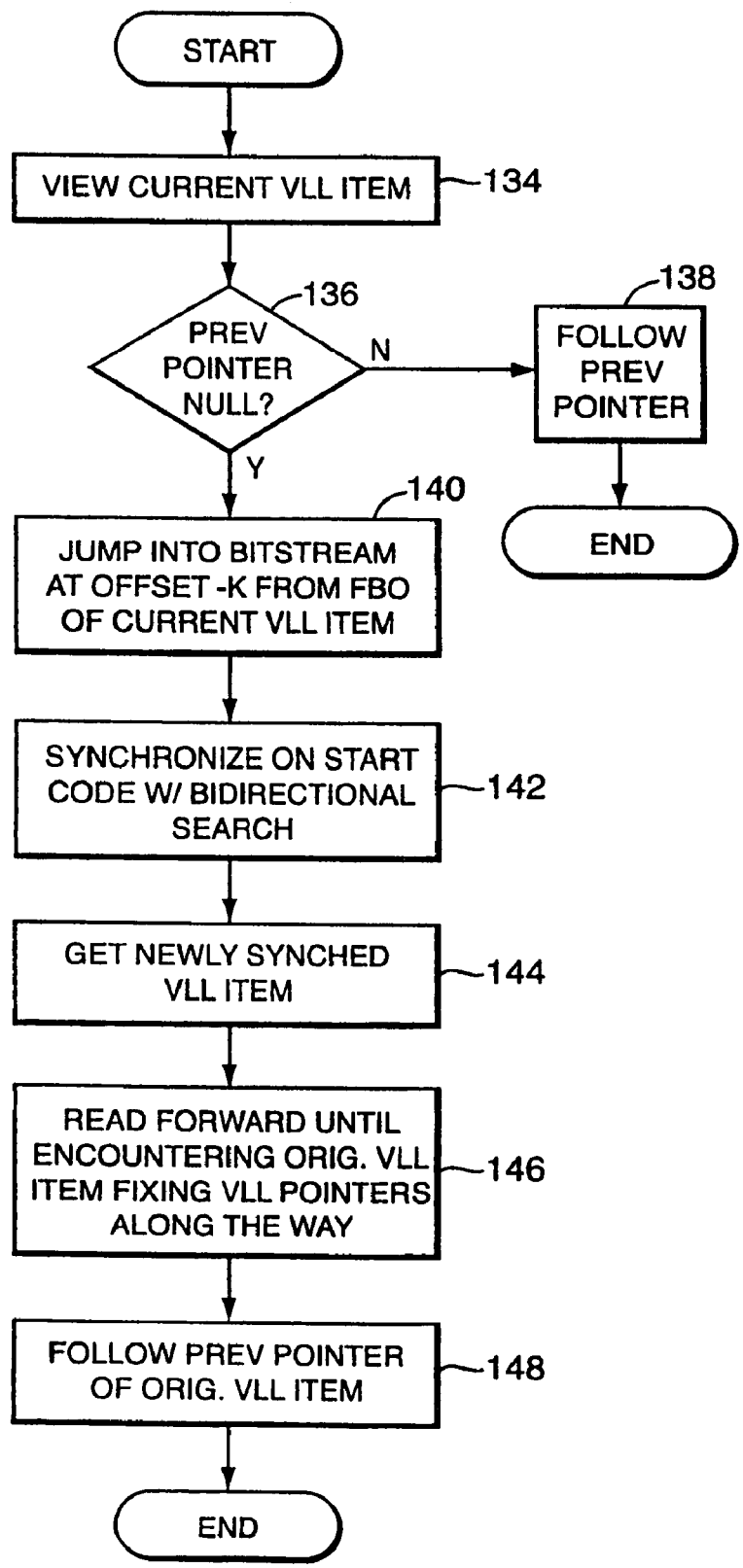
FIG. 18 is a flow diagram illustrating the backward searching in any linked list, e.g. the linked list of FIG. 5 when searching the LRU cache for a specific object.

FIG. 18 illustrates the process by which the virtual linked list is traversed backwards. The current item is recalled in operation 134. If the previous pointer is not null in operation 136, then previous pointer is followed in operation 138. If the previous pointer is null in operation 136, then operation 140 jumps into the bitstream at offset −k (negative k) from the file byte offset of the current virtual linked list item. Operation 142 synchronizes on the start code with a bi-directional search. Operation 144 obtains the newly synched virtual linked list item. Operation 146 reads forward until the original virtual linked list item obtained in operation 134 is obtained. As operation 146 reads forward, it sets up the virtual linked list pointers along the way. Sometimes the "paging in" of virtual linked list objects will cause other objects in the virtual linked list to be paged out of the LRU memory for the virtual linked list. It should be noted that the k constant is set to encompass a number of objects, not just one object. This is because the process of synching is computationally expensive, and it is less expensive to read the data stream forwards. Once operation 146 is completed, the previous pointer for the object obtained in operation 134 is no longer null and may be traversed in operation 148.

It will therefore be appreciated that a method for traversing a multiplexed data packet stream in accordance with the present invention includes choosing a starting location in a multiplexed data packet stream; making a bi-directional search from the starting location to locate a nearest system stream object; and traversing the system stream as a doubly-linked list of objects. Traversing the system stream preferably includes traversing object links of the doubly-linked list of objects. The objects are further preferably cached with an LRU process. Multiple disjoint locations in the system stream can be accessed with a virtual linked list developed by the process of the present invention. The virtual linked list can be used to search forwardly, backwardly, or both forwardly and backwardly. The multiplexed data packet stream can therefore be played backwardly or forwardly, and desired points in the stream can be effectively and accurately accessed by the user of the system.

Figure 19:
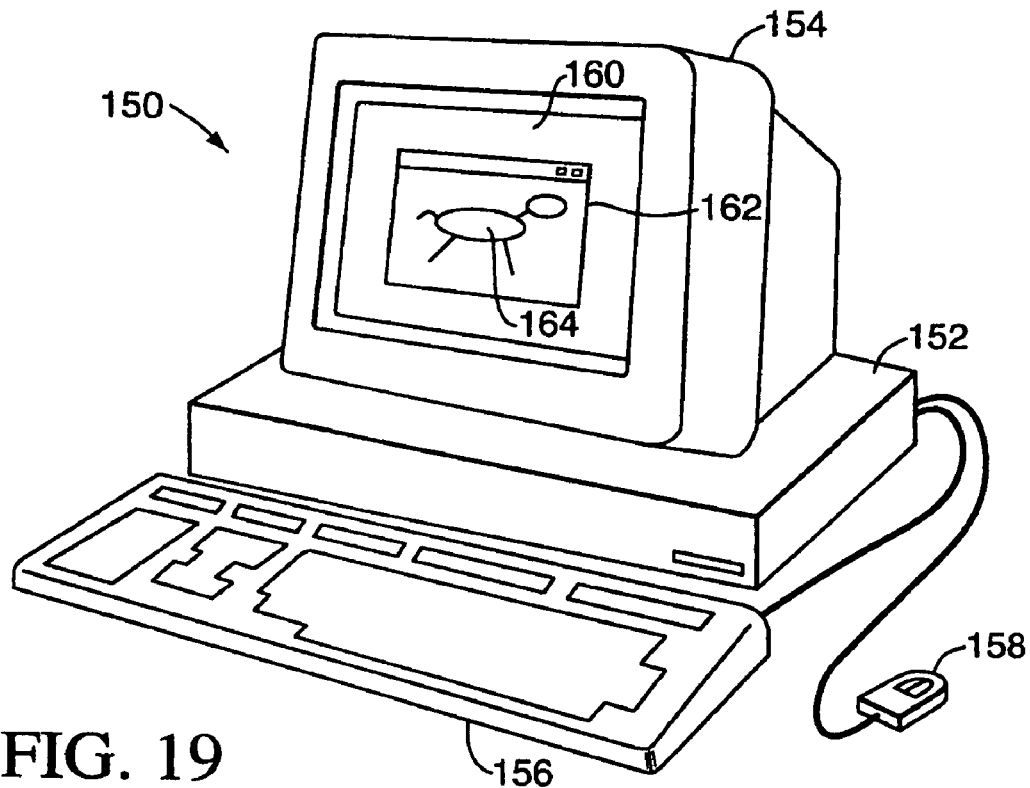
FIG. 19 is a pictorial view of a computer system implementing the method of the present invention.

In FIG. 19, a computer system implementing methods in accordance with the present invention includes a computer 152, a video monitor 154, a keyboard 156, and a mouse 158. The video monitor 154 has a screen 160 which can display a window 162 within which an image 164 derived from a multiplexed data packet stream. The various components of the computer system 152 are mentioned by way of example, and it will be appreciated by those skilled in the art that a computer system may have more or fewer, or equivalent components. For example, some computer systems operate with a touch-screen without, for example, a keyboard 156 or a mouse 158. Program instructions implementing the method or process of the present invention are stored in one or more computer readable media accessible to the computer 152. By way of example, but not limitation, computer readable media includes random access memory (RAM), read only memory (ROM), magnetic media such as floppy and hard disk drives, optical storage media such as CD-ROM and DVD discs, and memory and data resources available over a network.

Figure 20:
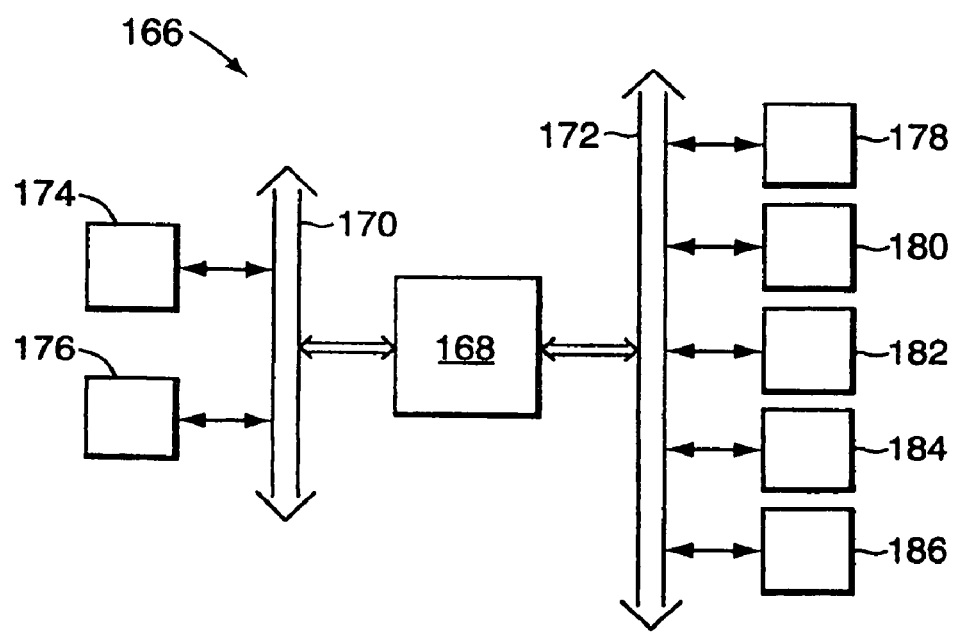
FIG. 20 is a block diagram of a digital processing system implementing the method of the present invention.

In FIG. 20, a digital processing system 166 can implement the methods ("processes") of the present invention. This digital processing system can form a part of a computer workstation, network computer, or personal computer system such as computer system 150 of FIG. 19, or can form part of a controller for other types of digital processing systems, such as a network data hub and/or digital video distribution hub. The system 166 includes a digital processor 168, which may be a general purpose microprocessor or a special purpose processor, as will be appreciated by those skilled in the art. The system 166 typically include one or more busses, illustrated here with a memory bus 170 and an I/O bus 172. Memory devices such as RAM 174 and ROM 176 may be coupled to the memory bus 170. Very high speed peripherals may also be coupled to the memory bus 172. Other "peripherals" 178-186 may be coupled to the I/O bus 172. Such peripherals may include a floppy disk drive 178, a hard disk drive 180, a CD-ROM drive 182, a DVD drive 184, and a network connection 186. It should be noted that the aforementioned memory and peripherals can all comprise computer readable media that can store data and program instructions implementing the methods of the present invention.

While this invention has been described in terms of several preferred embodiments, it is contemplated that alternatives, modifications, permutations and equivalents thereof will become apparent to those skilled in the art upon a reading of the specification and study of the drawings. It is therefore intended that the scope of this invention include all such alternatives, modifications, permutations and equivalents as fall within the true spirit and scope of following appended claims.

What is claimed is:

1. A method for bidirectional play of a rotary storage medium comprising:
    playing in a normal play mode a normally viewed portion of a multiplexed data packet stream derived from a rotary storage device; and
    playing an other than normally viewed portion of a multiplexed data packet stream derived from said rotary storage device in an other than normal play mode comprising one of a forward play and a reverse play of said multiplexed data packet stream by jumping one of forwardly and backwardly, respectively, into said data packet stream without the use of a pointer and then synchronizing with said data packet streams, wherein said at least one of a forward play and a reverse play is non-destructive of said multiplexed data packet stream.

2. The method for bidirectional play of a rotary storage medium as recited in claim 1 wherein said rotary storage medium is a magnetic storage medium.

3. The method for bidirectional play of a rotary storage medium as recited in claim 2 wherein said magnetic storage medium is part of a hard disk drive.

4. The method for bidirectional play of a rotary storage medium as recited in claim as recited in claim 1 wherein said rotary storage medium is an optical storage medium.

5. The method for bidirectional play of a rotary storage medium as recited in claim 4 wherein said optical storage medium is designed to read between the visible and ultraviolet spectrums.

6. The method for bidirectional play of a rotary storage medium as recited in claim 4 wherein said optical storage medium is a DVD.

7. The method for bidirectional play of a rotary storage medium as recited in claim 4 wherein said one of a forward play and a reverse play includes a fast forward play and a fast reverse play.

8. An optical rotary storage player comprising:
    means for playing in a normal play mode a normally viewed portion of a multiplexed data packet stream derived from a rotary storage device; and
    means for playing an other than normally viewed portion of a multiplexed data packet stream derived from said rotary storage device in an other than normal play mode comprising one of a forward play and a reverse play of said multiplexed data packet stream by jumping one of forwardly and backwardly, respectively, into said data packet stream without the use of a pointer and then synchronizing with said data packet stream, wherein said at least one of a forward play and a reverse play is non-destructive of said multiplexed data packet stream.

9. The optical rotary storage player as recited in claim 8 wherein said rotary storage device is selected from the group consisting essentially of magnetic storage devices and optical storage devices.

10. An apparatus for play of a multiplexed data packet stream comprising:
    a microprocessor;
    mass storage for a at least a portion of a multiplexed data packet stream coupled to said microprocessor; and
    ready only memory (ROM) coupled to said microprocessor, wherein said read only memory includes, at least in part, program instructions to access said mass storage and thereby, at least in part, to non-destructively read data from said multiplexed data packet to provide at least one of forward and backward play of said multiplexed data packet stream by jumping one of forwardly and backwardly, respectively, into said data packet stream without the use of a pointer and then synchronizing with said data packet stream.

11. The apparatus for play of a multiplexed data packet stream as recited in claim 10 wherein said mass storage is solid state memory.

12. The apparatus for play of a multiplexed data packet stream as recited in claim 10 wherein said mass storage is magnetic memory.

13. The apparatus for play of a multiplexed data packet stream as recited in claim 10 wherein said mass storage is optical memory.

14. The apparatus for play of a multiplexed data packet stream as recited in claim 10 wherein said forward play is a fast forward play.

15. The apparatus for play of a multiplexed data packet stream as recited in claim 10 wherein said backward play is a fast backward play.

16. The apparatus for play of a multiplexed data packet stream as recited in claim 10 wherein said microprocessor processes said multiplexed data packet stream into a data structure which can be read non-destructively.

17. The apparatus for play of a multiplexed data packet stream as recited in claim 10 wherein said mass storage is a hard disk drive.

18. The apparatus for play of a multiplexed data packet stream as recited in claim 10 wherein said mass storage is a DVD.

19. The apparatus for play of a multiplexed data packet stream as recited in claim 10 wherein said mass storage is a buffer.

* * * * *

UNITED STATES PATENT AND TRADEMARK OFFICE
CERTIFICATE OF CORRECTION

| | | |
|---|---|---|
| PATENT NO. | : 8,116,609 B2 | |
| APPLICATION NO. | : 11/496037 | |
| DATED | : February 14, 2012 | |
| INVENTOR(S) | : Michael L. Gough | |

It is certified that error appears in the above-identified patent and that said Letters Patent is hereby corrected as shown below:

Column 12, line 27, delete "ready" and insert therefor -- read --.

Signed and Sealed this
Fifteenth Day of May, 2012

David J. Kappos
*Director of the United States Patent and Trademark Office*